United States Patent [19]

Yamada et al.

[11] Patent Number: 4,921,761

[45] Date of Patent: May 1, 1990

[54] POLYESTER IMIDE RESINS

[75] Inventors: Shigeru Yamada, Tokyo; Setsuo Terada, Kounosu, both of Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 190,072

[22] Filed: May 4, 1988

[30] Foreign Application Priority Data

May 8, 1987 [JP] Japan .................. 62-110678

[51] Int. Cl.$^5$ .................. B32B 27/08; B32B 15/08
[52] U.S. Cl. .................. 428/473.5; 428/458; 428/379; 428/383; 528/289; 528/296; 528/85
[58] Field of Search .................. 428/473.5, 477.7, 458; 528/289

[56] References Cited

U.S. PATENT DOCUMENTS 4,170,684 10/1979 Schmidt et al. .................. 428/458
4,362,861 12/1982 Shen .................. 428/458

Primary Examiner—George F. Lesmes
Assistant Examiner—Elizabeth M. Cole
Attorney, Agent, or Firm—Oblon, Spivak, McClelland, Maier & Neustadt

[57] ABSTRACT

A polyester imide resin is made of a reaction product of (A) a dicarboxylic acid containing a 5-membered cyclic imido group or a derivative thereof, or a mixture thereof, (B) a tricarboxylic acid or a derivative thereof, or a mixture thereof, (C) a dihydric alcohol and (D) a trihydric aliphatic alcohol.

12 Claims, No Drawings

POLYESTER IMIDE RESINS

BACKGROUND OF THE INVENTION

1. Field of the Invention:

This invention relates to polyester imide resins, and more specifically to novel polyester imide resins capable of providing insulated wires which are excellent in solderability, softening point, heat resistance and workability. The term "solderability" as used herein means the property of an insulating film or the like that is strippable with molten solder.

2. Description of the Related Art:

In recent years, remarkable achievements have been made in the size and weight reduction of electric components such as motors and transformers. These achievements have taken an important role for the size and weight reduction not only in the field of home electric appliances but also in the fields of automotive vehicles and aircrafts. On the other hand, there is a strong demand for improvements in the reliability of electric components.

From the foregoing viewpoint, there is an outstanding demand for the development a material which has excellent heat resistance and is usable as a coating material for insulated wired to be employed in electric components such as motors and transformers.

For the size and weight reduction of such components, it is also necessary to make wires thinner. Since insulated wires of such a reduced diameter are subjected to heavier loads compared to conventional insulated wires, they are obviously require to exhibit higher performance.

As a result, the heat resistance of insulating materials for insulated wires has been improved, leading to the development of thermally stable materials such as class F (155° C.) glycerin-containing polyester imide resins, class H (180° C.) polyester imide resins containing tris-(2-hydroxyethyl) isocyanurate (hereinafter abbreviated as "THEIC"), class H (180° C.) THEIC-containing polyester amide-imide resins, class H (180° C.) THEIC-containing polyester resins, class K (200° C.) aromatic polyamide-imide resins and class M (220° C.) polyimide resins.

Since insulated wires coated principally with these resins are used under severe conditions, such resins are required to have chemical resistance, solvent resistance, hydrolysis resistance and alkali resistance in addition to heat resistance.

Besides improvements in heat resistance and the like of insulating materials, manufacturers of electric components also wish to rationalize the production steps for the reduction of the production cost and to improve the performance of the insulating materials. As one example of such wishes, it is desired to reduce the man power required for the end stripping work of these insulated wires and also to automate the end stripping work.

Insulated wires making use of the above-described insulating materials however have excellent chemical resistance, so that the automation of the end stripping work of these insulated wires is prevented.

There are now various methods for performing the end stripping work, including (1) mechanical stripping, (2) stripping relying upon thermal decomposition, (3) chemical stripping and (4) stripping with molten solder. The stripping method making use of molten solder (4) is however most preferred in view of the time required for the stripping work, the prevention of damages to thin conductors, the possibility of continuous performance of the stripping work, etc.

Accordingly, there is a strong demand from manufacturers of electric components for the development of insulating materials capable of affording insulated wires which permit the end stripping work with molten solder, in other words, are solderable and have heat resistance rated as class F (155° C.) to class H (180° C.).

In order to meet the above demand, solderable polyester imide resins have been developed.

In the present field of art, the expression "solderable" means that when an insulated wire is dipped in a bath of heated and molten solder, its insulating film is decomposed and removed at the dipped section and the solder is also applied on the conductor to facilitate subsequent soldering. Accordingly, it should not be interpreted in such a way that direct soldering is feasible.

Upon soldering a number of insulated wires of a twisted structure, there is a recent tendency to perform their end stripping work in such a way that the insulated wires with their insulating films still applied thereon are dipped directly in a bath of molten solder so as to perform both removal of the insulating films and soldering at the same time. For this purpose, the insulating films must be removed as soon as possible, namely, immediately after their dipping in the bath of the molten solder. Needless to say, the shorter the dipping time in the bath of the molten solder, the better.

In the end stripping work making use of molten solder, any molten solder temperatures higher than 400° C. leads to accelerated oxidation and deterioration of the molten solder and faster dissolution of copper as the conductor of the wires in the molten solder. The latter problem turns to the problem of thinning or diameter reduction of the insulated wires.

Although the above-mentioned conventional polyester imide resins having solderability have heat resistance of at least class F, they require a solder bath temperature of at least 450° C. and a dipping time period of at least 10 seconds in order to completely decompose insulating films in the solder bath and to avoid the existence of any carbonized coatings left over on the conductors. Nevertheless, their softening points are as low as 290°–300° C.

There is hence a demand for the development of an insulating material which permits end stripping work without leaving any carbonized coatings on conductors even when the temperature of the solder bath is 450° C. or lower and the dipping time is 10 seconds or shorter and which also has an excellent softening point.

SUMMARY OF THE INVENTION

The present inventors have carried out an extensive investigation with a view toward meeting the above demands. As a result, certain specific polyester imide resins capable of meeting the above demands have been found.

In a first aspect of this invention, there is thus provided a polyester imide resin which comprises a reaction product of (A) a dicarboxylic acid containing a 5-membered cyclic imido group or a derivative thereof, or a mixture thereof, (B) a tricarboxylic acid or a derivative thereof, or a mixture thereof, (C) a dihydric alcohol and (D) a trihydric aliphatic alcohol.

In a second aspect of this invention, there is also provided a polyester imide insulating coating formulation obtained by dissolving the polyester imide resin in an organic solvent.

In a third aspect of this invention, there is also provided solderable insulated wire obtained by coating a conductor with the insulating coating formulation and then baking the insulating coating formulation.

In a fourth aspect of this invention, there is also provided a solderable and heat-resistant, insulated wire obtained by coating the surface of the insulated wire with an insulating coating formulation containing an aromatic polyamide-imide and then baking the insulating coating formulation.

In a fifth aspect of this invention, there is also provided a solderable and heat-resistant, insulated wire obtained by coating the surface of the insulated wire with an insulating coating formulation containing a linear polyester polyamide-imide resin and then baking the insulating coating formulation.

In a sixth aspect of this invention, there is also provided a solderable and self-lubricating, insulated wire obtained by coating the surface of the insulated wire either directly or via another insulation with a self-lubricating coating composition composed principally of a polyamide resin and then baking the coating composition.

The use of the polyester imide resin of this invention can provide an insulated wire having excellent thermal, mechanical, electrical and chemical properties as well as good solderability. Although it has been considered in the prior art that solderability and heat resistance are properties which are contradictory to each other, this invention has provided the polyester imide resin which has a softening point of at least 300° C. while making it possible to provide an insulated wire permitting end stripping work with molten solder at 450° C. or lower and for 10 seconds or shorter.

DETAILED DESCRIPTION OF THE INVENTION AND PREFERRED EMBODIMENTS

The polyester imide resin of this invention is obtained by using the above components (A) and (B) as acid components and the above components (C) and (D) as alcohol components and then esterifying them by a method known per se in the art. In general, the above starting materials may be used as they are in most instances. However, their precursors may also be used.

It is preferable to use a polyester imide resin obtained by reacting the components (A), (B), (C) and (D) in proportions of 5-20 equivalent %, 10-30 equivalent %, 25-60 equivalent % and 10-40 equivalent % respectively.

Regarding the above proportions, if the proportion of the component (A) is smaller than 5 equivalent insulated wires to be obtained from the insulating material of this invention will have insufficient solderability and thermal shock resistance. If it exceeds 20 equivalent %, the production cost will jump up in view of the starting materials and the flexibility of coatings will be reduced. It is hence not preferred to use the component A in any proportion outside the above range. If the proportion of the component (B) is smaller than 10 equivalent %, the resulting insulated wires have insufficient solderability. If the proportion exceeds 30 equivalent %, difficulties will be encountered upon production of a resin and the resin will be lowered in flexibility. It is hence not preferable to use the component (B) in any proportion outside the above range. If the proportion of the component (C) is smaller than 25 equivalent %, the coatings of the resulting insulated wires will be lowered significantly in flexibility. Any proportions of the component (C) in excess of 60 equivalent % will however result in a reduction in solderability. If the proportion of the component (D) is smaller than 10 equivalent %, the softening point of coatings of the resulting insulated wires will be lowered, while any proportions of the component (D) greater than 40 equivalent % will lead to poor solderability. It is hence not preferable to use the component (D) in any proportion outside the above range.

In order to impart well-balanced solderability, softening point and class F heat-resistance properties to insulated electrical wires to be obtained from the polyester imide resin of this invention, it is preferable to use a resin obtained by reacting the components (A), (B), (C) and (D) in such proportions that the sum of the components (A) and (B) falls within a range of 30-40 equivalent % and the sum of the components (C) and (D) falls within a range of 60-70 equivalent %.

As illustrative examples of the component (A), namely, the dicarboxylic acid containing the 5-membered cyclic imido group or the derivative thereof or the mixture thereof useful in the practice of this invention, may be mentioned those obtained by reacting the following compounds (a) and (b) or the following compounds (a) and (c).

(a) Aromatic carboxylic anhydrides having at least one reactive group in addition to a 5-membered cyclic carboxylic anhydride moiety.

The former reactive group may be a carboxyl group, a carboxylic anhydride moiety, a hydroxyl group or the like.

The primary amines and half amides to be recited below under (b) are also usable so long as they can form, instead of the 5-membered cyclic carboxylic anhydride moiety, two carboxyl groups bonded to an adjacent carbon atom or esters or half esters thereof or two imido groups bonded to an adjacent carbon atom.

(b) Primary amines having at least one reactive group in addition to a primary amino group.

The former reactive group may be a carboxyl group, a hydroxyl group, a primary amino group or the like.

So long as the primary amino group can form an imido group, salts, amides, lactams and polyamides of the amines may also be used.

(c) Polyisocyanates:

As illustrative examples of the compound (a) having a 5-membered cyclic carboxylic anhydride moiety and another functional group, may be mentioned tricarboxylic anhydrides, for example, trimellitic acid anhydride, hemimellitic anhydride, 1,2,5-naphthalenetricarboxylic anhydride, 2,3,6-naphthalenetricarboxylic anhydride, 1,8,4-naphthalenetricarboxylic anhydride, 3,4,4'-diphenyltricarboxylic anhydride, 3,4,4'-diphenylmethanetricarboxylic anhydride, 3,4,4'-diphenylethertricarboxylic anhydride, 3,4,4'-benzophenonetricarboxylic anhydride, etc.

As exemplary tetracarboxylic dianhydrides, may be mentioned pyromellitic dianhydride, mellophanic dianhydride, 2,3,6,7-naphthalenetetracarboxylic dianhydride, 1,8,4,5-naphthalenetetracarboxylic dianhydride, 1,2,5,6-naphthalenetetracarboxylic dianhydride, 3,3',4,4'-diphenyltetracarboxylic dianhydride, 3,3',4,4'-diphenylethertetracarboxylic dianhydride, 3,3',4,4'-diphenylmethanetetracarboxylic dianhydride, 3,3',4,4'-benzophenonetetracarboxylic dianhydride, and so on.

Of these, it is trimellitic acid anhydride that is particularly useful.

Illustrative examples of the compound (b), which contains a primary amino group and at least one additional functional group, may include aliphatic diamines such as ethylenediamine, trimethylenediamine, tetramethylenediamine, pentamethylenediamine, hexamethylenediamine, heptamethylenediamine and octamethylenediamine; aromatic primary diamines such as 4,4'-diaminodiphenylmethane, 4,4'-diaminodiphenylpropane, 4,4'-diaminodiphenylsulfide, 4,4'-diaminodiphenylsulfone, 4,4'-diaminodiphenyl ether, 3,3'-diaminodiphenyl, 3,3'-diaminodiphenylsulfone, 3,3'-dimethyl-4,4'-bisphenyldiamine, 1,4-diaminonaphthalene, 1,5-diaminonaphthalene, m-phenylenediamine, p-phenylenediamine, m-xylylenediamine, p-xylylenediamine and 1-isopropyl-2,4-metaphenylenediamine; branched aliphatic diamines such as di-(p-aminocyclohexyl)methane diaminopropyl, 3-methyl-heptamethylenediamine, 4,4'-dimethylheptamethylenediamine, 2,5-dimethylhexamethylenediamine and 2,5-dimethylheptamethylenediamine; alicyclic diamines such as 1,4-diaminocyclohexanone and 1,10-diamino-1,10-dimethyldecane; amino alcohols such as monoethanolamine, monopropanolamine and dimethylethanolmaine; and aminocarboxylic acids such as glycocoll, aminopropionic acid and aminocaproic acid. Of these, the aromatic diamines are particularly preferred.

As illustrative examples of the polyisocyanate (c), may be mentioned single-nucleus polyisocyanates, e.g., m-phenylene diisocyanate, 2,4-tolylene diisocyanate, 2,6-tolylene diisocyanate, xylylene diisocyanate, etc. As exemplary aromatic polyisocyanate compounds having more than one nucleus, may be mentioned diphenylether-4,4'-diisocyanate, diphenylmethane-4,4'-diisocyanate, diphenylmethane-2,4'-diisocyanate, diphenylmethane-2,2'-diisocyanate, diphenylsulfone-4,4'-diisocyanate, diphenylthioether-4,4'-diisocyanate, anphthalene diisocyanate, etc. Hexamethylene diisocyanate and the like may also be mentioned.

So-called stabilized isocyanates obtained by stabilizing the isocyanate groups of these polyisocyanates with a phenolic hydroxyl group may also be used.

Most preferred as dicarboxylic acids containing a 5-membered cyclic imido group are dicarboxylic acids obtained from 2 moles of trimellitic acid anhydride and 1 mole of 4,4'-diaminodiphenylmethane, 1 mole of 4,4'-diaminodiphenyl ether, 1 mole of diphenylmethane-4,4'-diisocyanate and 1 mole of diphenylether-4,4'-diisocyanate respectively. In general, these dicarboxylic acids containing a 5-membered cyclic imido group can each be obtained by reacting the compounds (a) and (b) or the compounds (a) and (c) in a solvent.

As illustrative examples of the solvent useful upon obtaining the dicarboxylic acid containing a 5-membered imido group, may be mentioned N-methyl-2-pyrrolidone, N,N-dimethylacetamide, N,N-dimethylformamide, N,N-diethylacetamide, cresylic acid, phenol, o-cresol, m-cresol, p-cresol, 2,3-xylenol, 2,4-xylenol, 2,5-xylenol, 2,6-xylenol, 3,4-xylenol 3,5-xylenol, aliphatic hydrocarbons, aromatic hydrocarbons, halogenated hydrocarbons, ethers, ketones and esters. Specific examples of these solvents may include benzene, toluene, xylene, ethylbenzene, diethylbenzene, isopropylbenzene, petroleum naphtha, coal tar naphtha, solvent naphtha, acetone, methyl ethyl ketone, methyl isobutyl ketone, methyl acetate, ethyl acetate, etc. They may be used not only as single solvents but also as mixed solvents.

Illustrative examples of the derivative of the dicarboxylic acid containing a 5-membered cyclic imido group may include esters, halides, etc.

As illustrative examples of the tricarboxylic acid or its derivative (B), may be mentioned, in addition to trimellitic acid and trimesic acid, trimellitic acid anhydride, hemimellitic acid, 1,2,5-naphthalenetricarboxylic anhydride, 2,3,6-naphthalenetricarboxylic anhydride, 1,8,4-naphthalenetricarboxylic anhydride, 3,4,4'-diphenyltricarboxylic anhydride, 3,4,4'-diphenylmethanetricarboxylic anhydride, 3,4,4'diphenylethertricarboxylic anhydride, 3,4,4'-benzophenonetricarboxylic anhydride, etc.

Although esters of these tricarboxylic acids may also be included as their derivatives, trimellitic acid anhydride and trimellitic acid may be mentioned as particularly useful ones.

Illustrative examples of the dihydric alcohol (C) may include ethylene glycol; diethylene glycol; triethylene glycol, tetraethylene glycol; 1,2-propylene glycol; dipropylene glycol; 1,3-propanediol; various butane-, pentane- and hexanediols such as 1,3- and 1,4-butanediols, 1,5-pentanediols, 1,6-hexanediol, 1,4-butene-2-diol, 2,2-dimethylpropanediol-1,3, 2-ethyl-2-butyl-propanediol-1,3, 1,4-dimethylolcyclohexane and 1,4-butenediol; hydrogenated bisphenols, for example, hydrogenated p,p'-dihydroxydiphenylpropane and its analogous compounds; cyclic glycols, for example, 2,2,4,4-tetramethyl-1,3-cyclobutanediol, hydroquinone-di-β-hydroxyethyl-ether, 1,4-cyclohexanedimethanol, 1,4-cyclohexanediethanol, trimethylene glycol, hexylene glycol, octylene glycol, etc.

Of these, particularly preferred are ethylene glycol and 1,6-hexanediol.

The term "trihydric aliphatic alcohol" as used herein means those containing neither aromatic nor heterocyclic ring at any position in the molecule. When a trihydric alcohol containing an aromatic or heterocyclic ring or a tetrahydric or higher polyhydric alcohol is used, the solderability will be impaired significantly. Its addition is therefore not preferred.

As illustrative examples of these trihydric aliphatic alcohols (D), may be mentioned glycerin, 1,1,1-trimethylolethane, 1,1,1-trimethylolpropane, etc. Glycerin is particularly preferred.

The following processes may be mentioned as embodiments for synthesizing a polyester imide resin from these starting compounds in the present invention.

(1) The dicarboxylic acid (A) containing a 5-membered imido group is formed by reacting the starting compounds (a) and (b) or (a) and (c), which have been mentioned above in connection with the dicarboxylic acid (A) containing a 5-membered imido group, in a solvent.

The other starting materials (B), (C) and (D) are then added to the above reaction system, followed by an esterification reaction at 200°–210° C. for 3–7 hours to synthesize the polyester imide resin in the form of a solution.

(2) The dicarboxylic acid (A) containing a 5-membered imido group is formed by reacting the starting compounds (a) and (b) or (a) and (c), which have been mentioned above in connection with the dicarboxylic acid (A) containing a 5-membered imido group, in a solvent.

A polyester intermediate, which has been synthesized from the other starting materials (B), (C) and (D), is then added to the above reaction system, followed by an esterification reaction at 200°-210° C. for 3-5 hours to synthesize the polyester imide resin in the form of a solution.

(3) The dicarboxylic acid (A) containing a 5-membered cyclic imido group and systhesized from the above-described starting compounds (a) and (b) or (a) and (c) is added to a system of a polyester intermediate obtained in the same manner as in the above process (2). An esterification reaction is then allowed to proceed at 200°-210° C. for 3-5 hours to synthesize the polyester imide resin in the form of a solution.

(4) A solution of a polyester intermediate obtained in the same manner as in the above process (2) is cooled to 100° C. or lower, followed by an addition of the above-described compounds (a) and (b) which are starting compounds for the dicarboxylic acid (A) containing a 5-membered cyclic imido group. The imidocontaining dicarboxylic acid (A) is formed at 120°-160° C., and the reaction temperature is then raised to 200° C., whereby an esterification reaction is allowed to proceed at 200°-210° C. for 3-5 hours to synthesize the polyester imide resin in the form of a solution.

(5) The starting compounds (a) and (b), which are starting compounds for the dicarboxylic acid (A) containing a 5-membered cyclic imido group, and the other starting materials (B), (C) and (D) are mixed at once. In the same system, an imidation reaction is performed at 120°-160° C. The system is heated to 200° C., whereby a direct esterification reaction is conducted at 20020 -210° C. for 3-5 hours to synthesize the polyester imide resin in the form of a solution. This is a so-called simultaneous reaction process.

Although the polyester imide resin of this invention, which has been obtained by the reaction of the starting materials (A), (B), (C) and (D) as described above, can be used in any field where heat resistance is required, its most preferable application field is to use it as a principal component of an insulating coating formulation for electric wires.

In the second aspect of this invention, an insulating coating formulation can be obtained by either dissolving the polyester imide resin according to the first aspect of this invention with a solvent or adjusting the concentration of the polyester imide resin to a suitable level with the solvent.

Illustrative examples of the solvent may include those containing a phenolic hydroxyl group. It is preferable to use, for example, phenol, o-cresol, m-cresol, p-cresol, 2,3-xylenol, 2,4-xylenol, 2,5-xylenol, 2,6-xylenol, 3,4-xylenol, 3,5-xylenol, o-n-propylphenol, 2,4,6-trimethylphenol, 2,3,5-trimethylphenol, 2,4,5-trimethylphenol, 4-ethyl-2-methylphenol, 5-ethyl-2-methylphenol, and cresylic acid which is a mixture of the cresols and xylenols. Besides, polar solvents such as N-methyl-2-pyrrolidone and N,N-dimethylacetamide may also be used. As the diluent, it is possible to use, for example, an aliphatic hydrocarbon, aromatic hydrocarbon, ether, acetal, ketone, ester or the like.

As exemplary aliphatic hydrocarbons and aromatic hydrocarbons, may be mentioned n-heptane, n-octane, cyclohexane, decalin, dipentene, pinene, p-menthane, decane, dodecane, tetradecane, benzene, toluene, xylene, ethylbenzene, diethylbenzene, isopropylbenzene, amylbenzene, p-cymene and tetralin; mixtures thereof; petroleum naphtha; coal tar naphtha; and solvent naphtha.

Cresylic acid is most useful as a solvent for the insulating coating formulation making use of the polyester imide resin according to the first aspect of this invention. Cresylic acid has a boiling point range of from 180° C. to 230θ and contains phenol, o-cresol, m-cresol, p-cresol and xylenols.

By diluting cresylic acid with an aromatic hydrocarbon, for example, petroleum naphtha, coal tar naphtha, solvent naphtha or the like, it is possible to improve the efficiency of work upon production of an insulated wire by coating a conductor with an insulating coating formulation and then baking the insulating coating formulation.

Illustrative examples of such a diluent, may be mentioned xylene, solvent naphtha #2, solvesso #100, solvesso #150, etc. They may be used in an amount of 0-30%, preferably, 10-20% of the weight of the solvent.

It is preferable to use a small amount of a metal drying agent upon production of an insulated wire by coating a conductor with the thus-obtained insulating coating formulation and then baking the coating formulation, because the metal drying agent can improve the surface smoothness of the insulated wire and at the same time allows to increase the take-up speed and can hence improve the efficiency of the work further.

The octoate, linoleate or the like of zinc, calcium or lead is useful as the metal drying agent. Illustrative examples of the metal drying agent may include zinc octoate, calcium naphthenate, zinc naphthenate, lead naphthenate, lead linoleate, calcium linoleate, zinc resinate, etc. Besides, manganese naphthenate, cobalt naphthenate and the like may also be mentioned.

It is however more advantageous to use a compound such as titanic acid or zirconic acid instead of such a metal drying agent.

As representative titanic acid compounds, may be mentioned tetraalkyl titanates such as tetraisopropyl titanate, tetrabutyl titanate, tetrahexyl titanate, tetramethyl titanate, tetrapropyl titanate and tetraoctyl titanate.

Tetraalkyl titanium chelate compounds obtained by reacting tetraalkyl titanates with octylene glycol triethanolamine, 2,4-pentadiene, an acetoacetic ester or the like are also useful.

Tetraalkyl titanium acylates obtained by tetraalkyl titanates with stearic acid or the like are also useful.

As compounds of zirconic acid, may be mentioned tetraalkyl zirconates, zirconium chelate compounds, zirconium acylates, which correspond to the above-described titanic acid compounds.

These metal compounds may be added in an amount of 0.1-6.0 wt. %, preferably, 1-3 wt. % based on the solid content of the above-described insulating coating formulation.

A stabilized polyisocyanate formed by blocking the isocyanate groups of a polyisocyanate with phenol, cresol or the like may be used as a hardening agent. As illustrative examples of such a stabilized polyisocyanate, may be mentioned the cyclic trimer of 2,4-tolylene diisocyanate, the cyclic trimer of 2,6-tolylene diisocyanate, the trimer of diphenylmethane-4,4'-diisocyanate, the reaction product of diphenylmethane-4,4'-diisocyanate and trimethylolpropane at a molar ratio of 3 to 1, the reaction product of 2,4-tolylene diisocyanate and trimethylolpropane at a molar ratio of 3 to 1, the reaction product of 2,6-tolylene diisocyanate and trimethylolpropane at a molar ratio of 3 to 1, the reaction product of 2,4-tolylene diisocyanate and trimethylolethane at a molar ratio of 3 to 1, the reaction product of 2,6-tolylene diisocyanate and trimethylolethane at a molar ratio of 3 to 1, the reaction product of mixed 2,4- and 2,6-tolylene diisocyanates and trimethylolpropane at a molar ratio of 3 to 1, and a stabilized polyisocyanate obtained by blocking the cyclic trimer or the like of mixed 2,4- and 2,6-tolylene diisocyanates. In addition, stabilized isocyanate obtained by blocking diphenylmethane-4,4'-diisocyanate with xylenol is also useful.

Further, the appearance and work efficiency of insulated wires can be improved further by adding 1-5 wt. % of a phenol-formaldehyde resin, melamineformaldehyde resin, cresol-formaldehyde resin, xyleneformaldehyde resin, epoxy resin or silicone resin. If the proportion of such a resin is smaller than 1 wt. %, the proportion is too small to improve the work efficiency. If such a resin is added in an amount greater than 5 wt. %, a carbonized matter will be formed substantially upon stripping the coating with molten solder. A phenol-formaldehyde resin or xyleneformaldehyde resin is particularly preferred. The addition of such a resin in a proportion of 1-2 wt. % can improve the appearance and work efficiency of an insulated wire without impairing its solderability.

In the third embodiment of this invention, a solderable insulated wire making use of the insulating coating formulation according to the second aspect of this invention is provided. The heat-resistant insulated wire can be obtained by coating a conductor with the insulating coating formulation and then baking the coating formulation to a desired coating thickness.

The conductor usable here may be a copper, silver, aluminum or stainless steel wire by way of example. Usable conductor diameters may be of any sizes, ranging from very thin wires to thick wires. The present invention is not limited to any specific conductor diameter. In general, copper wires having a diameter of from about 0.050 to 2.0 mm or so are used.

A desired insulating film can be formed on the conductor by following a conventionally-known method. It may be formed, for example, by applying the insulating coating formulation in accordance with a method such as felt squeezing or die squeezing and then causing the thus-coated conductor to pass several times to somewhat more than ten times repeatedly through a baking oven of about 350°-550° C. The thickness of the insulating film is that specified in a standard such as JIS, NEMA, IEC or the like.

According to the first to third aspects of this invention, solderable heat-resistant insulated wires improved significantly in both softening point and solderability can be provided economically.

In the fourth aspect of this invention, there is provided a solderable heat-resistant insulated wire obtained by applying a film, which is made from an aromatic polyamide-imide insulating coating formulation, over the surface of the insulated wire according to the third embodiment.

The term "aromatic polyamide-imide insulating coating formulation" as used herein means an insulating coating formulation which is composed principally of an aromatic polyamide-imide resin or an aromatic polyamide-imide precursor resin.

Regarding the production process of the polyamide-imide resin contained as a principal component in the polyamide-imide insulating coating formulation, reference may be had, for example, to Japanese Patent Publication Nos. 9698/1964, 15637/1967, 19814/1968, 22998/1968, 30260/1968, 19274/1969, 27395/1969, 29269/1969, 2397/1970, 9394/1970, 27611/1970, 35072/1970, 35073/1970, 37902/1970, 38574/1970, 2270/1971, 29730/1971, 42385/1971, 3659/1972, 33079/1972, 10999/1973, 17759/1973, 18117/1973 and 34455/1974; U.S. Pat. Nos. 3,238,181, 3,260,691, 3,306,771, 3,314,923, 3,347,828, 3,360,502, 3,392,144, 3,428,486, 3,440,215, 3,458,595 and 3,562,217; and U.K Pat. Nos. 1,032,649, 1,119,791, 1,155,230 and 1,160,097.

As the most representative production process, the acid chloride of a tricaroxylic anhydride and at least one diamine or a tricarboxylic anhydride and a diisocyanate are reacted. The latter production process is preferred. Insulating coating formulations of the present invention are limited to the use of either one of a polyamide-imide resin and polyamideimide precursor resin, which are both aromatic resins. Of these, an insulating coating formulation composed principally of a polyamide-imide resin formed of trimellitic acid anhydride and diphenylmethane-4,4'-diisocyanate is useful.

The aromatic polyamide-imide insulating coating formulation useful in the practice of the fourth aspect of this invention has been described above. The solderable and heat-resistant insulated wire of this invention can be provided by coating a conductor with the above-described polyester imide insulating coating formulation, baking the coating formulation into a desired film thickness, and then applying and applying the above-described aromatic polyamide-imide insulating coating formulation to a desired film thickness in a similar manner.

The conductor employed here is similar to the conductor exemplified above. For the formation of the insulating film of the different kind on the conductor, a conventionally-known method may be followed as described above. The thickness of the insulating film is that specified in a specification such as JIS, NEMA, IEC or the like. Of the film, the inner, i.e., lower layer accounts for about 60-90 wt. %, preferably, 70-80 wt. % of the whole film. If such a film thickness is not formed by a single coating and baking operation, the coating and baking operation may be repeated as many as needed.

According to the fourth aspect of this invention, a solderable heat-resistant insulated wire improved significantly in softening point, solderability and temperature index can be obtained economically by forming the lower layer of an insulating film of a double-layered structure with the specific polyester imide resin and then applying the upper layer with the aromatic polyamide-imide insulating coating formulation.

In the fifth aspect of this invention, there is provided a solderable heat-resistant insulated wire formed by covering the surface of the insulated wire according to the third aspect of this invention with a film formed from a linear polyester amide-imide insulating coating formulation.

By the term "linear polyester amide-imide insulating coating formulation" as used in the fifth aspect of this invention, is meant an insulating coating formulation composed principally of a linear polyester amide-imide resin or a linear polyester imide-amide precursor resin.

Regarding the production process of the linear polyester amide-imide resin or its precursor resin which is contained as a principal component in the cresol-soluble linear polyester amide-imide insulating coating formulation, reference may be made, for example, to Japanese Patent Publication Nos. 11624/1967, 13597/1970, 18316/1970, 18678/1970, 5089/1971, 23920/1972, 26116/1972, 40717/1972, 46480/1972, 3717/1973, 4709/1974, 21676/1975, 21677/1975, 23409/1975, 23410/1975, 35555/1975, 7689/1976, 15859/1976, 23999/1976, 46155/1976, 46156/1976, 7032/1977, 31543/1977, 39718/1977, 20661/1979 and 38296/1979.

An insulating coating formulation of a cresol-soluble linear polyester amide-imide resin, which is a reaction product of an intermediate and a linear polyester compound, is useful. The intermediate is prepared, as the most representative production process, by masking with diphenyl carbonate the terminal groups of an amido- and imido-containing dicarboxylic acid which has been obtained by reacting trimellitic acid anhydride, a dibasic acid and diphenylmethane-4,4'-diisocyanate.

The polyester amide-imide insulating coating formulation useful in the fifth aspect of this invention has been described above. The solderable heat-resistant insulated wire according to the fifth aspect of this invention can be provided by applying and baking the above polyester amide-imide insulating coating formulation to a desired film thickness on the surface of the insulated wire of the third aspect of this invention in a similar manner.

The conductor useful here may be a conductor similar to the above-exemplified conductors.

For the formation of the insulating film of the different kind on the conductor, a conventionally-known method may be followed as described above. The thickness of the insulating film is that specified in a specification such as JIS, NEMA, IEC or the like. In the film, the lower layer accounts for about 60–90 wt. %, preferably, 70–80 wt. % of the whole film. If such a film thickness is not formed by a single coating and baking operation, the coating and baking operation may be repeated as many as needed.

According to the fifth aspect of this invention, a solderable heat-resistant insulated wire improved significantly in softening point, solderability and temperature index can be obtained economically by forming the lower layer of an insulating film of a double-layered structure with the specific polyester imide resin and then applying the upper layer with the polyester amide-imide insulating coating formulation.

In the sixth aspect of this invention, there is provided a solderable, self-lubricating, insulated wire obtained by applying and baking a self-lubricating coating formulation composed principally of an polyamide resin either directly or via another insulation on the surface of the insulated wire according to the third aspect of this invention.

The self-lubricating coating formulation useful in the sixth aspect of this invention is obtained by dissolving a polyamide resin, which is composed principally of 6-nylon or 6,6-nylon, in the above-described solvent. It is also preferred to add one or more additives, for example, another polyamide resin, wax, carnauba wax, montan wax and metal salts thereof, and mixtures thereof.

Such self-lubricating coating formulations are disclosed, for example, in Japanese Patent Laid-Open Nos. 80204/1980, 88211/1980, 5205/1982, 60616/1982, 126010/1082, 17179/1983, 128709/1984, 140268/1984, etc.

The self-lubricating coating formulation which is useful in the sixth aspect of this invention and is composed principally of a polyamide resin has been described above. The solderable self-lubricating insulated wire according to the sixth aspect of this invention can be provided by applying and baking a self-lubricating coating formulation of a polyamide resin as a principal component to a desired film thickness on the surface of the insulated wire of the third aspect of this invention in a similar manner.

The conductor useful here may be a conductor similar to the above-exemplified conductors.

For the formation of the insulating film of the different kind on the conductor, a conventionally-known method may be followed as described above. The thickness of the insulating film is that specified in a specification such as JIS, NEMA, IEC or the like. In the film, the thickness of the insulating film is that specified in a specification such as JIS, NEMA, IEC or the like. In the thickness, the thickness of the self-lubricating film may be 10μm or smaller, preferably 2–5 μm. If such a film thickness is not formed by a single coating and baking operation, the coating and baking operation may be repeated as many as needed.

According to the sixth aspect of this invention, a solderable self-lubricating insulated wire improved significantly in softening point, solderability, self-lubricity and solderability can be obtained economically by forming the lower layer of an insulation film of a multi-layered structure with the specific polyester imide resin and then covering the upper layer with the self-lubricating coating formulation, Details of the present invention will hereinafter be described specifically by the following Referential Examples, Comparative Examples and Examples. It should however be borne in mind that this invention is not limited to or by the following Examples.

REFERENTIAL EXAMPLE 1

Trimellitic acid anhydride (192 g, 1.0 mole) was added to 600 g of cresol, followed by an addition of 99 g (0.5 mole) of 4,4'-diaminodiphenylmethane. The resultant mixture was reacted at 140° C. for 6 hours. After cooling, a precipitate of fine crystals having a pale yellow color was obtained. The precipitate was washed several times with ethanol and then collected by filtration, thereby obtaining a 5-membered cyclic diimidodicarboxylic acid.

REFERENTIAL EXAMPLE 2

Trimellitic acid anhydride (192 g, 1.0 mole) was added to 600 g of cresol, followed by an addition of 100 g (0.5 mole) of 4,4'-diaminodiphenyl ether. The resultant mixture was reacted at 180° C. for 4 hours. After cooling, a precipitate of brown crystals was obtained. The precipitate was washed several times with ethanol and then collected by filtration, thereby obtaining a 5-membered cyclic diimidodicarboxylic acid.

REFERENTIAL EXAMPLE 3

Trimellitic acid anhydride (192 g, 1.0 mole) was added to 600 g of cresol, followed by an addition of 124 g (0.5 mole) of 4,4'-diaminodiphenylsulfone. The resultant mixture was reacted at 160° C. for 4 hours. After cooling, a precipitate of white crystals was obtained. The precipitate was washed several times with ethanol and then collected by filtration, thereby obtaining a 5-membered cyclic diimidodicarboxylic acid.

REFERENTIAL EXAMPLE 4

Trimellitic acid anhydride (192 g, 1.0 mole) was added to 600 g of cresol, followed by an addition of 108 g (0.5 mole) of p-phenylenediamine. The resultant mixture was reacted at 180° C. for 4 hours. After cooling, a precipitate of greenish brown crystals was obtained. The precipitate was washed several times with ethanol and then collected by filtration, thereby obtaining a 5-membered cyclic diimidodicarboxylic acid.

REFERENTIAL EXAMPLE 5

Trimellitic acid anhydride (192 g, 1.0 mole) was added to 600 g of cresol, followed by an addition of 58 g (0.5 mole) of hexamethylenediamine. The resultant mixture was reacted at 180° C. for 4 hours. After cooling, a precipitate of white crystals was obtained. The precipitate was washed several times with ethanol and then collected by filtration, thereby obtaining a 5-membered cyclic diimidodicarboxylic acid.

REFERENTIAL EXAMPLE 6

Trimellitic acid anhydride (192 g, 1.0 mole) and 137 g (1.0 mole) of p-aminobenzoic acid were added to and dispersed in 600 g of cresol. The resultant mixture was reacted at 150° C. for 4 hours. After cooling, a fine granular precipitate of white powder was obtained. The precipitate was washed several times with ethanol and then collected by filtration, thereby obtaining a 5-membered cyclic diimidodicarboxylic acid.

REFERENTIAL EXAMPLE 7

Trimellitic acid anhydride (192 g, 1.0 mole) and 125 g (0.5 mole) of diphenylmethane-4,4'-diisocyanate were added to 150 g of solvent naphtha ("Hi-Sol #100", trade name; product of Nippon Petrochemicals Co., Ltd.). The resultant mixture was reacted at 150° C. for 4 hours. Violent foaming took place as the reaction proceeded, followed by solidification. The resultant solid matter was ground to obtain a 5-membered cyclic diimidodicarboxylic acid.

REFERENTIAL EXAMPLE 8

Trimellitic acid anhydride (192 g, 1.0 mole) and 126 g (0.5 mole) of diphenylether-4,4'-diisocyanate were added to 150 g of solvent naphtha ("Hi-Sol #100", trade name; product of Nippon Petrochemicals Co., Ltd.). The resultant mixture was reacted at 150° C. for 4 hours. Violent foaming took place as the reaction proceeded, followed by solidification. The resultant solid matter was ground to obtain a 5-membered cyclic diimidodicarboxylic acid.

REFERENTIAL EXAMPLE 9

Trimellitic acid anhydride (185 g, 0.95 mole) and 250 g (1.0 mole) of diphenylmethane-4,4'-diisocyanate were added to a mixed solvent composed of 810 g of N-methyl-2-pyrrolidone and 90 g of xylol. When the reaction temperature was raised to 100° C., the reaction proceeded promptly and considerable foaming (evolution of carbon dioxide) was observed. The reaction mixture was heated further to 140° C., at which the reaction was continued for about 3 hours to obtain a polyamide-imide insulating coating formulation.

REFERENTIAL EXAMPLE 10

Trimellitic acid anhydride (125 g, 0.65 mole), 42 g (0.25 mole) of isophthalic acid and 130 g of cresol were placed in a reactor and were then heated to 100° C. Under stirring, 200 g (0.8 mole) of diphenylmethane-4,4'-diaminoisocyanate were added. Thereafter, they were reacted at 240° C. for 3 hours. Diphenyl carbonate (20 g) and 1 g of tetrabutyl titanate were added to the reaction mixture, followed by a reaction for 2 hours. Cresol (480 g) was added subsequent to the reaction. On the side, 200 g of polyethylene terephthalate, 100 g of diphenyl carbonate and 2 g of tetrabutyl titanate were placed in a reactor and then reacted at 240° C. for 2 hours to form an oligomer. Eighty grams of the oligomer were added to the former reaction mixture, followed by a reaction at 180° C. for 1 hour. Thereafter, 8 g of tetrabutyl titanate was added. With a 7:3 mixed solvent of cresol/xylene, a linear polyester amide-imide resin coating formulation having a non-volatile content of 30% was obtained.

REFERENTIAL EXAMPLE 11

In a 4-necked 2,000 cc flask fitted with a stirrer, a nitrogen gas inlet tube, a thermometer and a condenser, 160 g of 6-nylon ("Aramin CM 1001", trade name; product of Toray Industries, Inc.) was dissolved under heat at about 80° C. for 3 hours in 672 g of cresol and 168 g of "Hi-Sol #100" (trade name; aromatic solvent; product of Nippon Petrochemicals Co., Ltd.), thereby producing a self-lubricating polyamide coating formulation useful in the practice of this invention.

REFERENTIAL EXAMPLE 12

A self-lubricating polyamide coating formulation useful in the practice of this invention was produced in the same manner as in Referential Example 11 except that 160 g of 6,6-nylon ("Aramin CM 3001N", trade name; product of Toray Industries, Inc.) was used instead of 6-nylon.

REFERENTIAL EXAMPLE 13

A self-lubricating polyamide coating formulation useful in the practice of this invention was produced in the same manner as in Referential Example 11 except that 160 g of modified 6,6-nylon ("Aramin CM 3001N", trade name; product of Toray Industries, Inc.) and 4.8 g of carnauba wax were used instead of 6-nylon.

Examples of First to Third Aspects of The Invention

EXAMPLE 1

In a 4-necked 2,000 cc flask fitted with a stirrer, a nitrogen gas inlet tube, a thermometer and a condenser, 192 g (1.0 mole) of trimellitic acid anhydride was added to and dispersed in 600 g of cresol in the same manner as in Referential Example 1. 4,4'-Diaminodiphenylmethane (99 g, 0.5 mole) was then added, and the resultant mixture was reacted at 150° C. for 3 hours to obtain 273 g (1.0 equivalent) of a 5-membered cyclic diimidodicarboxylic acid. After cooling the reaction mixture to 100° C. or lower, 96 g (1.5 equivalents) of trimellitic acid anhydride, 105 g (3.4 equivalents) of ethylene glycol and 26 g (0.85 equivalent) of glycerin were added. The contents were heated under stirring to 200° C. over 6 hours and at the same temperature, were reacted for 5 hours.

The 5-membered cyclic diimidodicarboxylic acid reacted with the resulting polyester component, whereby a clear resin solution was obtained. In order to determine the progress of the reaction on the basis of an increase in viscosity, samples were collected periodically. The reaction was terminated when the viscosity of the resin sample reached $Z_3$ (as measured by a Gardner viscometer) at a resin concentration of 40% in cresol. After termination of the reaction, cresol was added to the reaction mixture to adjust the total concentration of non-volatile components to 40%. The above-employed "Hi-Sol #100" (trade name; aromatic solvent; product of Nippon Petrochemicals Co., Ltd.) was added to the resultant mixture to obtain a resin solution containing 35% of the non-volatile components. A phenol-formaldehyde resin composed principally of tetrabutyl titanate and tert-butylphenol was added further in an amount of 2% based on the resin content, thereby preparing an insulating coating formulation of a polyester imide resin according to this invention.

EXAMPLE 2

In a 4-necked 1,000 cc flask fitted with a stirrer, a nitrogen gas inlet tube, a thermometer and a condenser, 192 g (1.0 mole) of trimellitic acid anhydride was added to and dispersed in 600 g of cresol. 4,4'-Diaminodiphenylmethane (99 g, 0.5 mole) was then added, and the resultant mixture was reacted at 150° C. for 3 hours to obtain 273 g (1.0 equivalent) of a 5-membered cyclic diimidodicarboxylic acid. The reaction mixture was cooled to 100° C. or lower. On the side, in a 500 cc reaction vessel similar to the above-mentioned flask, 96 g (1.5 equivalents) of trimellitic acid anhydride, 105 g (3.4 equivalents) of ethylene glycol, 26 g (0.85 equivalent) of glycerin and 30 g of xylene were heated under stirring to 200° C. over 6 hours and were then reacted at the same temperature.

After cooling the polyester component to 80° C., it was added to a dispersion of the above-prepared 5-membered cyclic diimidocarboxylic acid to conduct a reaction again. The reaction was carried out up to a temperature of 200° C. over 5-7 hours. The 5-membered cyclic diimidodicarboxylic acid reacted with the polyester component, whereby a clear resin solution was obtained. In order to determine the progress of the reaction on the basis of an increase in viscosity, samples were collected periodically. The reaction was terminated when the viscosity of the resin sample reached $Z_3+$ (as measured by a Gardner viscometer) at a resin concentration of 40% in cresol. After termination of the reaction, cresol was added to the reaction mixture to adjust the total concentration of non-volatile components to 40%. The above-employed "Hi-Sol #100" (trade name; aromatic solvent; product of Nippon Petrochemicals Co., Ltd.) was added to the resultant mixture to obtain a resin solution containing 35% of the non-volatile components.

The thus-obtained resin solution was processed in the same manner as in Example 1, thereby producing an insulating coating formulation containing a polyester imide resin according to this invention.

EXAMPLE 3

In a 4-necked 2,000 cc flask fitted with a stirrer, a nitrogen gas inlet tube, a thermometer and a condenser, 96 g (1.5 equivalents) of trimellitic acid anhydride, 105 g (3.4 equivalents) of ethylene glycol, 26 g (0.85 equivalent) of glycerin and 30 g of xylene were heated under stirring to 200° C. over 6 hours, thereby reacting them to synthesize a polyester component. Cresol (300 g) was added to the polyester component and the resultant mixture was cooled to 80° C. Thereafter, 192 g (1.0 mole) of trimellitic acid anhydride and 96 g (0.5 mole) of 4,4'-diaminodiphenolmethane were added, and the reaction temperature was raised to 200° C. In the course of that heating, a 5-membered cyclic diimidodicarboxylic acid (1.0 equivalent) was formed and precipitated at 140°-150° C. so that the reaction mixture became cloudy and highly viscous. As the temperature became higher, the diimidodicarboxylic acid was progressively absorbed in the polyester component so that the reaction mixture turned into a solution-like mixture and then into a clear resin solution. The resin solution was then heated at a reaction temperature of 200° C. for 1-2 hours. In order to determine the progress of the reaction on the basis of an increase in viscosity, samples were collected periodically. The reaction was terminated when the viscosity of the resin sample reached $Z_2$ (as measured by a Gardner viscometer) at a resin concentration of 40% in cresol. After termination of the reaction, cresol was added to the reaction mixture to adjust the total concentration of non-volatile components to 40%. The above-employed "Hi-Sol #100" (trade name; aromatic solvent; product of Nippon Petrochemicals Co., Ltd.) was added to the resultant mixture to obtain a resin solution containing 35% of the non-volatile components.

The thus-obtained resin solution was processed in the same manner as in Example 1, thereby producing an insulating coating formulation containing a polyester imide resin according to this invention.

EXAMPLE 4

In a 4-necked 2,000 cc flask fitted with a stirrer, a nitrogen gas inlet tube, a thermometer and a condenser, 288 g (2.5 equivalents) of trimellitic acid anhydride, 99 g (0.5 mole) of 4,4'-diaminodiphenylmethane, 105 g (3.4 equivalents) of ethylene glycol, 26 g (0.85 equivalent) of glycerin and 300 g of cresol were heated under stirring to 200° C. over 6 hours. In the course of that heating, a 5-membered cyclic diimidodicarboxylic acid was formed and precipitated at 140° C. so that the reaction mixture became cloudy and highly viscous. As the temperature became higher, the 5-membered cyclic diimidodicarboxylic acid was absorbed gradually in the polyester component. A reaction was continued at 200° C. for 5 hours. In order to determine the progress of the reaction on the basis of an increase in viscosity, samples were collected periodically. The reaction was terminated when the viscosity of the resin sample reached $Z_2+$ (as measured by a Gardner viscometer) at a resin concentration of 40% in cresol. After termination of the reaction, cresol was added to the reaction mixture to adjust the total concentration of non-volatile components to 40%. The above-employed "Hi-Sol #100" (trade name; aromatic solvent; product of Nippon Petrochemicals Co., Ltd.) was added to the resultant mixture to obtain a resin solution containing 35% of the non-volatile components.

The thus-obtained resin solution was processed in the same manner as in Example 1, thereby producing an insulating coating formulation containing a polyester imide resin according to this invention.

EXAMPLE 5

An insulating coating formulation containing a polyester imide resin according to this invention was obtained in the same manner as in Example 3 except for the use of 200 g (3.4 equivalents) of 1,6-hexanediol in lieu of 105 g (3.4 equivalents) of ethylene glycol.

EXAMPLE 6

An insulating coating formulation containing a polyester imide resin according to this invention was obtained in the same manner as in Example 3 except that 200 g (3.4 equivalents) of 1,6-hexanediol was used in place of 105 g (3.4 equivalents) of ethylene glycol and 38 g (0.85 equivalent) of 1,1,1-trimethylolpropane was used instead of 26 g (0.85 equivalent) of glycerin.

EXAMPLE 7

Following the procedure of Example 3, an insulating coating formulation containing a polyester imide resin according to this invention was obtained from 58 g (0.9 equivalent) of trimellitic acid anhydride, 93 g (3.0 equivalents) of ethylene glycol, 92 g (3.0 equivalents) of glycerin, 20 g of xylene, 900 g of cresol, 384 g (2.0 moles) of trimellitic acid anhydride and 198 g (1.0 mole) of 4,4'-diaminodiphenylmethane (namely, 2.0 equivalents of the diimidodicarboxylic acid).

EXAMPLE 8

Following the procedure of Example 3, an insulating coating formulation containing a polyester imide resin according to this invention was obtained from 250 g (3.9 equivalents) of trimellitic acid anhydride, 310 g (10.0 equivalents) of ethylene glycol, 92 g (3.0 equivalents) of glycerin, 20 g of xylene, 1,100 g of cresol, 192 g (1.0 mole) of trimellitic acid anhydride and 99 g (0.5 mole) of 4,4'-diaminodiphenylmethane (namely, 1.0 equivalents of the diimidodicarboxylic acid).

EXAMPLES 9-13

Following the procedure of Example 3, insulating coating formulations containing respectively polyester imide resins according to this invention were separately obtained using the 5-membered cyclic diimidodicarboxylic acids of Referential Examples 2-6 respectively in place of 192 g (1.0 mole) of trimellitic acid anhydride and 99 g (0.5 mole) of 4,4'-diaminodiphenylmethane.

EXAMPLE 14

Following the procedure of Example 3, an insulating coating formulation containing a polyester imide resin according to this invention was obtained using the 5-membered cyclic diimidodicarboxylic acid of Referential Example 8 in place of 192 g (1.0 mole) of trimellitic acid anhydride and 99 g (0.5 mole) of 4,4'-diaminodiphenylmethane.

COMPARATIVE EXAMPLE 1

In a 4-necked 2,000 cc flask fitted with a stirrer, a nitrogen gas inlet tube, a thermometer and a condenser, 340 g (3.5 equivalents) of dimethyl terephthalate, 155 g (5.0 equivalents) of ethylene glycol, 154 g (5.0 equivalents) of glycerin, 0.4 g of litharge and 300 g of xylene were placed and mixed. The contents were heated to 180° C., at which they were reacted for 5 hours. To the reaction mixture, 410 g (1.5 equivalents) of the 5-membered cyclic diimidodicarboxylic acid obtained in Referential Example 7 was added gradually. In the course of the addition, the reaction temperature was raised to 200° C. During this procedure, the 5-membered cyclic diimidodicarboxylic acid reacted with the polyester component so that a clear resin solution was obtained. The reaction temperature was thereafter raised to 240° C., at which the reaction mixture was maintained for 1-2 hours. The reaction mixture was then distilled under reduced pressure. When the reaction mixture became sufficiently viscous, cresol was added to adjust the total concentration of non-volatile components to 40%. "Hi-Sol #100" (trade name; aromatic solvent; product of Nippon Petrochemicals Co., Ltd.) was added to the resultant mixture to obtain a resin solution containing 35% of the non-volatile components.

Tetrabutyl titanate in an amount of 3% based on the resin content was added further, thereby obtaining an insulating coating formulation containing a polyester imide resin as a comparative resin.

COMPARATIVE EXAMPLE 2

In a 4-necked 2,000 cc flask fitted with a stirrer, a nitrogen gas inlet tube, a thermometer and a condenser, 340 g (3.5 equivalents) of dimethyl terephthalate, 155 g (5.0 equivalents) of ethylene glycol, 154 g (5.0 equivalents) of glycerin, 0.4 g of litharge and 300 g of xylene were placed and mixed. The contents were heated to 180° C., at which they were reacted for 5 hours. After cooling the reaction mixture to 80° C., 288 g (1.5 moles) of trimellitic acid anhydride and 149 g (0.75 mole) of 4,4'-diaminophenolmethane were added. The reaction temperature was raised to 200° C. In the course of the heating, a 5-membered cyclic diimidodicarboxylic acid formed at 140°-150° C. reacted with the polyester component so that a clear resin solution was obtained. The reaction temperature was thereafter raised to 240° C., at which the reaction mixture was maintained for 1-2 hours. The reaction mixture was then distilled under reduced pressure. When the reaction mixture became sufficiently viscous, cresol was added to adjust the total concentration of non-volatile components to 40%. "Hi-Sol #100" (trade name; aromatic solvent; product of Nippon Petrochemicals Co., Ltd.) was added to the resultant mixture to obtain a resin solution containing 35% of the non-volatile components. Tetrabutyl titanate in an amount of 3% based on the resin content was added further, thereby obtaining an insulating coating formulation containing a polyester imide resin as a comparative resin.

COMPARATIVE EXAMPLE 3

In the same manner as in Comparative Example 2, an insulating coating formulation containing a polyester imide resin as a comparative resin was obtained using 295 g (5.0 equivalents) of 1,6-hexanediol instead of 155 g (5.0 equivalents) of ethylene glycol.

In order to conduct a test on the performance of those insulating coating formulations, the insulating coating formulations of the Examples and Comparative Examples, which contained their corresponding polyester imide resins, were applied and baked under the following conditions to produce insulated wires respectively.

Conductor diameter: 0.32 mm
Baking oven: Horizontal baking oven having an effective oven length of 2.5 m
Baking temperature: 500° C. (max.)
Squeezing method: Die squeezing
Number of coating operation: 6 times
Film thickness: 0.020-0.025 mm The test was conducted following the testing method for enameled copper wires and enameled aluminum wires as prescribed in JIS C3003-1984. Test results are shown in Table 1. As apparent from the test results, it is clear that the softening point and solderability were improved significantly by the use of the insulating coating formulations containing their corresponding polyester imide resins according to this invention compared with the use of the insulating coating formulations containing the conventional polyester imide resins respectively.

TABLE 1

| | Softening point load: 400 g, 2° C./min | Solderability (sec) | | |
|---|---|---|---|---|
| | | 440° C. | 460° C. | 480° C. |
| Ex. 1 | 319 | 7.0 | 4.0 | 2.5 |
| Ex. 2 | 326 | 6.5 | 3.5 | 2.0 |
| Ex. 3 | 328 | 6.5 | 3.5 | 2.0 |
| Ex. 4 | 321 | 7.0 | 3.5 | 2.5 |
| Ex. 5 | 309 | 4.0 | 2.0 | 1.0 |
| Ex. 6 | 310 | 5.0 | 3.0 | 1.5 |
| Ex. 7 | 306 | 9.0 | 5.0 | 3.0 |
| Ex. 8 | 330 | 5.0 | 3.0 | 1.5 |
| Ex. 9 | 328 | 7.0 | 4.0 | 2.5 |
| Ex. 10 | 325 | 6.5 | 4.0 | 2.5 |
| Ex. 11 | 326 | 6.5 | 4.5 | 2.5 |
| Ex. 12 | 312 | 5.0 | 2.5 | 1.0 |
| Ex. 13 | 326 | 6.5 | 4.5 | 2.5 |
| Ex. 14 | 327 | 8.0 | 4.5 | 2.5 |
| Comp. Ex. 1 | 290 | 18.0 | 6.0 | 4.0 |
| Comp. Ex. 2 | 295 | 18.0 | 17.5 | 4.0 |
| Comp Ex. 3 | 223 | 8.5 | 4.5 | 2.0 |

Examples of Fourth Aspect of the Invention

EXAMPLES 15-28 AND COMPARATIVE EXAMPLES 4-6

Using the insulating coating formulations of Examples 1-14 of the first to third aspects of this invention, Comparative Examples 1-3 and Referential Example 9 separately, double-coated insulated wires of the fourth aspect of this invention and certain comparative examples were produced under the following conditions.
  Conductor diameter: 0.32 mm
  Baking oven: Horizontal baking oven having an effective oven length of 2.5 m
  Baking temperature: 500° C. (max.)
  Squeezing method: Die squeezing
  Number of coating operations:
    6 times/lower layer, plus
    3 times/upper layer
  Lower layer: Polyester imide insulating coating formulation
  Upper layer: Aromatic polyamide insulating coating formulation prepared in Referential Example 9
  Film thickness: 0.025-0.030 mm A test was conducted following the testing method for enameled copper wires and enameled aluminum wires as prescribed in JIS C3003-1984. Test results are shown in Table 2. As apparent from the test results, it is clear that the softening point, solderability and temperature index (TI) were improved significantly by the use of the polyester imide insulating coating formulations according to this invention compared with the use of the conventioal polyester imide insulating coating formulations.

Incidentally, each TI (temperature index) was measured in accordance with IEC 251-1978 (Methods of test for winding wires, Part 1: Enameled round wires).

TABLE 2

| | Softening point load: 400 g. 2° C./min | Solderability (sec) | | | TI °C. |
|---|---|---|---|---|---|
| | | 440° C. | 460° C. | 480° C. | |
| Ex. 15 | 341 | 10.0 | 6.0 | 4.0 | — |
| Ex. 16 | 347 | 9.5 | 6.5 | 4.0 | — |
| Ex. 17 | 348 | 9.5 | 5.5 | 4.0 | 206-208 |
| Ex. 18 | 342 | 10.0 | 6.5 | 4.0 | 204-208 |
| Ex. 19 | 328 | 8.0 | 4.0 | 3.0 | — |
| Ex. 20 | 328 | 8.0 | 5.0 | 3.5 | — |
| Ex. 21 | 322 | 11.0 | 8.0 | 6.0 | ≧210 |
| Ex. 22 | 353 | 8.0 | 5.0 | 3.5 | ≧210 |
| Ex. 23 | 346 | 9.0 | 5.5 | 3.5 | — |
| Ex. 24 | 346 | 9.5 | 6.0 | 4.5 | — |
| Ex. 25 | 344 | 8.5 | 6.5 | 4.0 | — |
| Ex. 26 | 332 | 8.0 | 4.5 | 2.5 | — |
| Ex. 27 | 345 | 9.5 | 6.5 | 4.5 | — |
| Ex. 28 | 346 | 10.0 | 6.5 | 5.0 | — |
| Comp. Ex. 4 | 311 | 22.0 | 9.0 | 6.0 | 183-185 |
| Comp. Ex. 5 | 318 | 20.5 | 8.5 | 6.0 | 188 |
| Comp. Ex. 6 | 243 | 10.5 | 7.0 | 4.0 | 171 |

Examples of Fifth Aspect of the Invention

EXAMPLES 29-42 AND COMPARATIVE EXAMPLES 7-9

Using the insulating coating formulations of Examples 1-14 of the first to third aspects of this invention, Comparative Examples 1-3 and Referential Example 10 separately, double-coated insulated wires of the fifth aspect of this invention and certain comparative examples were produced under the following conditions.
  Conductor diameter: 0.32 mm
  Baking oven: Horizontal baking oven having an effective oven length of 2.5 m
  Baking temperature: 500° C. (max.)
  Squeezing method: Die squeezing
  Number of coating operations:
    6 times/lower layer, plus
    3 times/upper layer
  Lower layer: Polyester imide insulating coating formulation
  Upper layer: Linear polyester amide-imide insulating coating formulation prepared in Referential Example 10
  Film thickness: 0.025-0.030 mm A test was conducted following the testing method for enameled copper wires and enameled aluminum wires as prescribed in JIS C3003-1984. Test results are shown in Table 3. As apparent from the test results, it is clear that the softening point, solderability and temperature index (TI) were improved significantly by the use of the polyester imide insulating coating formulations according to this invention compared with the use of the conventional polyester imide insulating coating formulations.

TABLE 3

| | Softening point load: 400 g, 2° C./min | Solderability (sec) | | | TI °C. |
|---|---|---|---|---|---|
| | | 440° C. | 460° C. | 480° C. | |
| Ex. 29 | 330 | 9.5 | 5.5 | 3.5 | — |
| Ex. 30 | 338 | 9.0 | 5.5 | 3.5 | — |
| Ex. 31 | 338 | 9.0 | 5.0 | 3.0 | 202-206 |
| Ex. 32 | 331 | 9.5 | 5.0 | 3.0 | 200-202 |

TABLE 3-continued

| | Softening point load: 400 g, 2° C./min | Solderability (sec) | | | TI °C. |
|---|---|---|---|---|---|
| | | 440° C. | 460° C. | 480° C. | |
| Ex. 33 | 320 | 7.0 | 3.5 | 2.0 | — |
| Ex. 34 | 323 | 7.5 | 4.5 | 3.5 | — |
| Ex. 35 | 314 | 10.0 | 7.0 | 5.0 | 206 |
| Ex. 36 | 342 | 7.5 | 5.0 | 2.5 | 207 |
| Ex. 37 | 337 | 8.5 | 5.5 | 3.0 | — |
| Ex. 38 | 336 | 8.5 | 5.0 | 3.5 | — |
| Ex. 39 | 336 | 8.0 | 5.5 | 3.5 | — |
| Ex. 40 | 321 | 7.5 | 3.5 | 2.0 | — |
| Ex. 41 | 336 | 9.0 | 5.5 | 3.0 | — |
| Ex. 42 | 338 | 9.5 | 6.0 | 3.5 | — |
| Comp. Ex. 7 | 301 | 20.0 | 7.5 | 5.0 | 181 |
| Comp. Ex. 8 | 307 | 19.5 | 7.5 | 5.5 | 182–185 |
| Comp. Ex. 9 | 238 | 9.5 | 6.5 | 3.5 | 162–164 |

Examples of Sixth Aspect of the Invention

EXAMPLES 43–56 AND COMPARATIVE EXAMPLES 10–12

Using the insulating coating formulations of Examples 1–14 of the first to third aspects of this invention, Comparative Examples 1–3 and Referential Examples 11–13 separately, self-lubricating insulated wires of the sixth aspect of this invention and certain comparative examples were produced under the following conditions.

Conductor diameter: 0.32 mm
Baking oven: Horizontal baking oven having an effective oven length of 2.5 m
Baking temperature:
  Insulating layer: 500° C. (max.)
  Lubricating layer: 500° C. (max.)
Squeezing method: Die squeezing
Take-up speed: 20 m/min
Number of coating operations:
  Insulating layer: 6 times
  Lubricating layer: 2 times (by simultaneous coating method)
Film thickness: 0.014–0.026 mm A test was conducted following the testing method for enameled copper wires and enameled aluminum wires as prescribed in JIS C3003-1984. Test results are shown in Table 4. As apparent from the test results, it is clear that the softening point, self-lubricating property, solderability and temperature index (TI) were improved significantly by the use of the polyester imide insulating coating formulations according to this invention compared with the use of the conventional polyester imide insulating coating formulations.

TABLE 4

| | Example 43 | Example 44 | Example 45 | Example 46 |
|---|---|---|---|---|
| Used polyester imide coating formulation | Example 1 | Example 1 | Example 1 | Example 2 |
| Used self-lubricating coating formulation | Ref. Ex. 11 | Ref. Ex. 12 | Ref. Ex. 13 | Ref. Ex. 12 |
| Structure | | | | |
| Insulating layer thickness(mm) | 0.020 | 0.020 | 0.019 | 0.020 |
| Lubricating layer thickness(mm) | 0.001 | 0.001 | 0.001 | 0.001 |
| Softening point (°C.), wt: 400 g, 2° C./min | 309 | 310 | 308 | 313 |
| Solderability (sec) | | | | |
| 400° C. | 7.0 | 7.0 | 7.0 | 6.5 |
| 460° C. | 4.0 | 4.0 | 4.0 | 3.5 |
| 480° C. | 2.5 | 2.5 | 2.5 | 2.0 |
| Temperature index (°C.) | — | — | — | — |
| Static coefficient of friction* | 0.115 | 0.110 | 0.073 | 0.113 |

| | Example 47 | Example 48 | Example 49 | Example 50 |
|---|---|---|---|---|
| Used polyester imide coating formulation | Example 3 | Example 4 | Example 5 | Example 6 |
| Used self-lubricating coating formulation | Ref. Ex. 12 | Ref. Ex. 12 | Ref. Ex. 12 | Ref. Ex. 12 |
| Structure | | | | |
| Insulating layer thickness(mm) | 0.019 | 0.020 | 0.021 | 0.020 |
| Lubricating layer thickness(mm) | 0.001 | 0.001 | 0.001 | 0.001 |
| Softening point (°C.), wt: 400 g, 2° C./min | 314 | 310 | 295 | 301 |
| Solderability (sec) | | | | |
| 400° C. | 6.5 | 7.0 | 4.0 | 5.0 |
| 460° C. | 3.5 | 3.5 | 2.0 | 3.0 |
| 480° C. | 2.0 | 2.5 | 1.0 | 1.5 |
| Temperature index (°C.) | 193–198 | 186–188 | — | — |
| Static coefficient of friction* | 0.118 | 0.115 | 0.113 | 0.115 |

| | Example 51 | Example 52 | Example 53 | Example 54 |
|---|---|---|---|---|
| Used polyester imide coating formulation | Example 7 | Example 8 | Example 9 | Example 10 |
| Used self-lubricating coating formulation | Ref. Ex. 12 | Ref. Ex. 12 | Ref. Ex. 12 | Ref. Ex. 12 |
| Structure | | | | |
| Insulating layer thickness(mm) | 0.020 | 0.020 | 0.019 | 0.020 |
| Lubricating layer thickness(mm) | 0.001 | 0.001 | 0.001 | 0.001 |
| Softening point (°C.), wt: 400 g, 2° C./min | 293 | 328 | 314 | 300 |
| Solderability (sec) | | | | |
| 400° C. | 9.0 | 5.0 | 7.0 | 5.0 |
| 460° C. | 5.0 | 3.0 | 4.0 | 2.5 |
| 480° C. | 1.5 | 1.5 | 2.5 | 1.0 |
| Temperature index (°C.) | ≧200 | ≧200 | — | — |
| Static coefficient of friction* | 0.073 | 0.113 | 0.118 | 0.115 |

| | Example 51 | Example 52 | Comp. Ex. 1 | Comp. Ex. 2 | Comp. Ex. 3 |
|---|---|---|---|---|---|
| Used polyester imide coating formulation | Example 11 | Example 14 | Comp. Ex. 1 | Comp. Ex. 2 | Comp. Ex. 3 |
| Used self-lubricating coating | | | Ref. | Ref. | Ref. |

TABLE 4-continued

| formulation | Ref. Ex. 12 | Ref. Ex. 12 | Ex. 12 | Ex. 12 | Ex. 12 |
|---|---|---|---|---|---|
| Structure | | | | | |
| Insulating layer thickness(mm) | 0.020 | 0.020 | 0.021 | 0.020 | 0.020 |
| Lubricating layer thickness(mm) | 0.001 | 0.001 | 0.001 | 0.001 | 0.001 |
| Softening point (°C.), wt: 400 g, 2° C./min | 315 | 293 | 273 | 274 | 201 |
| Solderability (sec) | | | | | |
| 400° C. | 6.5 | 4.0 | 18.0 | 17.5 | 8.5 |
| 460° C. | 4.5 | 2.0 | 6.0 | 6.5 | 4.5 |
| 480° C. | 2.5 | 1.0 | 4.0 | 4.0 | 2.0 |
| Temperature index (°C.) | — | — | 168 | 163–165 | 157 |
| Static coefficient of friction* | 0.113 | 0.116 | 0.117 | 0.113 | 0.114 |

*The static coefficient of friction between insulated wires was measured. Namely, two insulated wires were mounted parallel to each other on a metal block. The two insulated wires were placed on two insulated wires of the same kind arranged on a flat surface in such a way that the former insulated wires extended at right angles relative to the latter insulated wires. The static coefficient of friction of the insulated wires is determined by dividing a minimum force, which is required to move the metal block along the latter two insulated wires, by the weight of the metal block.

We claim:

1. A polyester imide resin obtained by reacting in the presence of an organic solvent (A) a dicarboxylic acid containing a 5-membered cyclic imido group or a derivative thereof, or a mixture thereof, (B) a tricarboxylic acid or a derivative thereof, or a mixture thereof, (C) a dihydric alcohol and (D) a trihydric aliphatic alcohol in a proportion of 5–20 equivalent %, 10–30 equivalent %, 25–60 equivalent % and 10–40 equivalent %, respectively.

2. The polyester imide resin as claimed in claim 1, wherein the sum of components (A) and (B) is within the range of 30 to 40 equivalent % and the sum of the components (C) and (D) is within the range of 60 to 70 equivalent.

3. The polyester imide resin as claimed in claim 1, wherein the dicarboxylic acid containing the 5-membered cyclic imido group is a dicarboxylic acid obtained by reacting 2 moles of trimellitic acid anhydride and 1 mole of a diamine or diisocyanate.

4. The polyester imide resin as claimed in claim 1, wherein the tricarboxylic acid is trimellitic acid or trimellitic acid anhydride.

5. The polyester imide resin as claimed in claim 1, wherein the dihydric alcohol is ethylene glycol or 1,6-hexanediol.

6. The polyester imide resin as claimed in claim 1, wherein the trihydric alcohol is glycerin or 1,1,1-trimethylolpropane.

7. A polyester imide insulating coating formulation obtained by dissolving the polyester imide resin according to claim 1 in an organic solvent.

8. The polyester imide insulating coating formulation as claimed in claim 7, further comprising an alkyl titanate, a phenol-formaldehyde resin and/or a xylene-formaldehyde resin.

9. A solderable insulated wire obtained by coating a conductor with the insulating coating formulation according to claim 7 and then baking the insulating coating formulation.

10. A solderable and heat-resistant, insulated wire obtained by coating the surface of the insulated wire according to claim 9 with an insulating coating formulation containing an aromatic polyamide-imide and then baking the insulating coating formulation.

11. A solderable and heat-resistant, insulated wire obtained by coating the surface of the insulated wire according to claim 9 with an insulating coating formulation containing a linear polyester polyamideimide resin and then baking the insulating coating formulation.

12. A solderable and self-lubricating, insulated wire obtained by coating the surface of the insulated wire according to claim 9 either directly or via another insulation with a self-lubricating coating composition composed principally of a polyamide resin and then baking the coating composition.

* * * * *